(12) United States Patent
Novaes

(10) Patent No.: US 6,507,863 B2
(45) Date of Patent: Jan. 14, 2003

(54) DYNAMIC MULTICAST ROUTING FACILITY FOR A DISTRIBUTED COMPUTING ENVIRONMENT

(75) Inventor: Marcos N. Novaes, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/238,202

(22) Filed: Jan. 27, 1999

(65) Prior Publication Data

US 2002/0165977 A1 Nov. 7, 2002

(51) Int. Cl.[7] .............................................. G06F 15/16
(52) U.S. Cl. ........................ 709/201; 709/227; 709/245
(58) Field of Search ................................. 709/201, 227, 709/245

(56) References Cited

U.S. PATENT DOCUMENTS

| | | | | |
|---|---|---|---|---|
| 5,331,637 A | * | 7/1994 | Francis et al. | 370/54 |
| 5,361,256 A | | 11/1994 | Doeringer et al. | 370/60 |
| 5,365,523 A | | 11/1994 | Derby et al. | 370/85.2 |
| 5,426,637 A | * | 6/1995 | Derby et al. | 370/85.13 |
| 5,444,694 A | | 8/1995 | Millet et al. | 370/16.1 |
| 5,461,609 A | | 10/1995 | Pepper | 370/16 |
| 5,473,599 A | | 12/1995 | Li et al. | 370/16 |
| 5,583,862 A | | 12/1996 | Callon | 370/397 |
| 5,583,997 A | | 12/1996 | Hart | 395/200.15 |
| 5,649,091 A | | 7/1997 | Ould-Ali et al. | 395/182.09 |
| 5,659,685 A | | 8/1997 | Williams et al. | 395/200.5 |
| 5,661,719 A | | 8/1997 | Townsend et al. | 370/216 |
| 5,799,146 A | * | 8/1998 | Badovinatz et al. | 395/182.02 |
| 5,831,975 A | * | 11/1998 | Chen et al. | 370/256 |
| 6,256,747 B1 | * | 7/2001 | Inohara et al. | 714/4 |

OTHER PUBLICATIONS

Huang et al., "Group Leader Election under Link–State Routing", IEEE, 1997.*
Deering et al., "The PIM Architecture for Wide–Area Multicast Routing", IEEE, 1996.*
IBM Technical Disclosure Bulletin, "Method for Improving Network Availability with Redundant Network Servers", vol. 39, No. 08, (Aug. 1996), pp. 195–196.
Gregory Pfister, "In Search of Clusters", ISBN 0–13899709, 1998 Prentice Hall, pp. 72–76.
G. Wright and R. Stevens, "IP Multicast Routing", TCP/IP Illustrated, Addison–Wesley, ISBN 0–201–63354–X, 1995, pp.397–398; 401; 404–405.

* cited by examiner

Primary Examiner—John A. Follansbee
(74) Attorney, Agent, or Firm—Lawrence D. Cutter, Esq.; Kevin P. Radigan, Esq.; Heslin Rothenberg Farley & Mesiti P.C.

(57) ABSTRACT

A Dynamic Multicast Routing (DMR) facility is provided for a distributed computing environment having a plurality of networks of computing nodes. The DMR facility automatically creates virtual interfaces between selected computing nodes of the networks to ensure multicast message reachability to all functional computing nodes within the distributed computing environment. The DMR facility employs a group of group leader nodes (GL_group) among which virtual interfaces for multicast messaging are established. Upon failure of one of the group leader nodes, another computing node of the respective network having the failing group leader node is assigned group leader status for re-establishing virtual interfaces. Virtual interfaces are established between the group leader nodes such that redundancy in message routing is avoided.

24 Claims, 7 Drawing Sheets

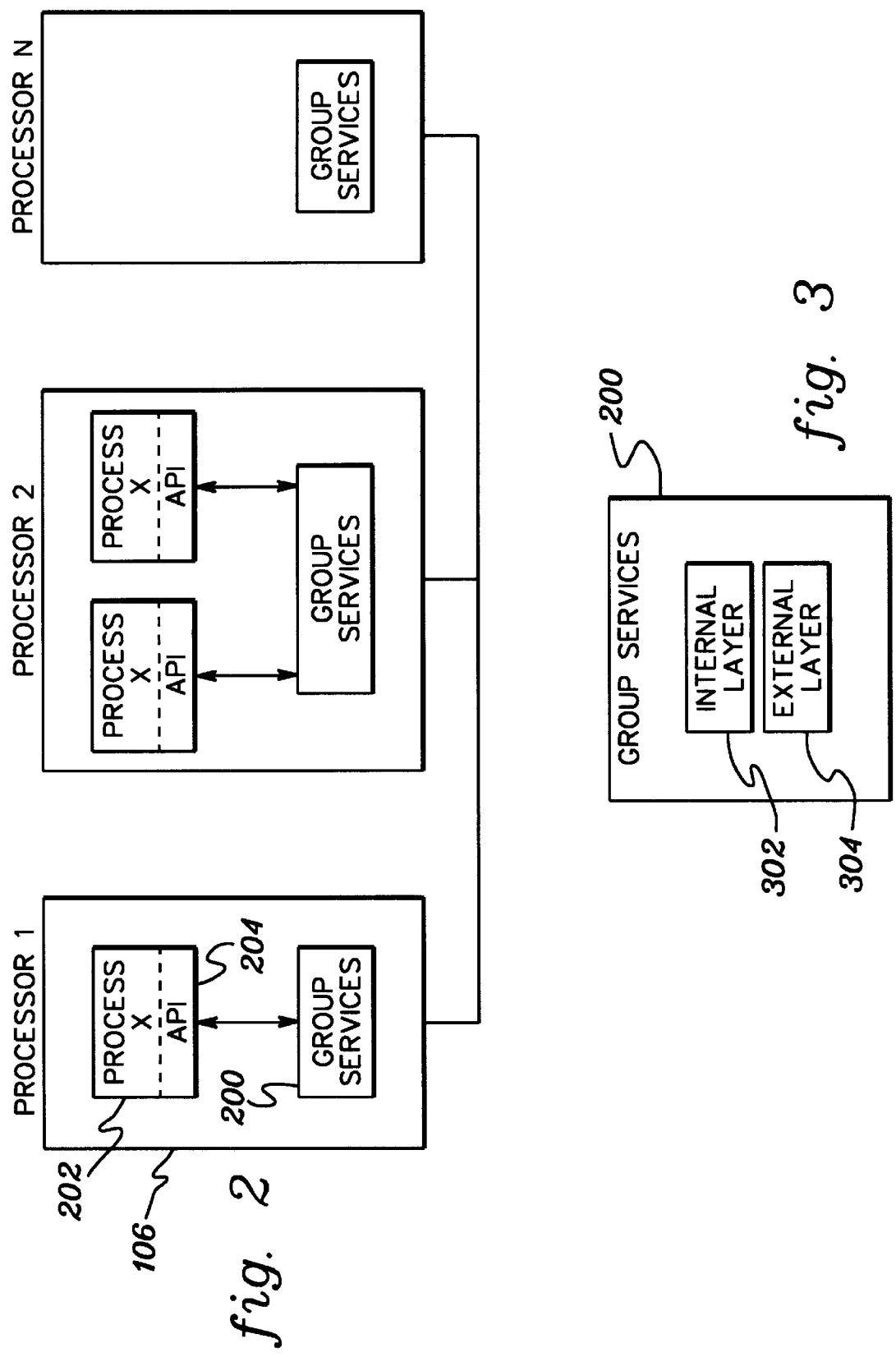

DYNAMIC MULTICAST ROUTING FACILITY FOR A DISTRIBUTED COMPUTING ENVIRONMENT

CROSS-REFERENCE TO RELATED APPLICATIONS/PATENTS

This application contains subject matter which is related to the subject matter of the following applications and patents. Each of the below-listed applications and patents is hereby incorporated herein by reference in its entirety:

U.S. Ser. No. 08/640,305, filed Apr. 30, 1996, entitled "An Application Programming Interface Unifying Multiple Mechanisms", now abandoned in favor of continuation application Ser. No. 08/960,074, filed Nov. 24, 1997 now U.S. Pat. No. 6,026,426;

U.S. Ser. No. 08/641,445, filed Apr. 30, 1996, entitled "Utilizing Batch Request to Present Membership Changes to Process Groups" now U.S. Pat. No. 6,104,871;

U.S. Pat. No. 5,805,786, issued Sep. 8, 1998, entitled "Recovery of a Name Server Managing Membership of a Domain of Processors in a Distributed Computing Environment";

U.S. Pat. No. 5,799,146, issued Aug. 25, 1998, entitled "Communications System Involving Groups of Processors of a Distributed Computing Environment";

U.S. Pat. No. 5,793,962, issued Aug. 11, 1998, entitled "System for Managing Membership of Group of Processors in a Distributed Computing Environment";

U.S. Pat. No. 5,790,788, issued Aug. 4, 1998, entitled "Managing Group Events by a Name Server for a Group of Processors in a Distributed Computing Environment";

U.S. Pat. No. 5,790,772, issued Aug. 4, 1998, entitled "Communications Method Involving Groups of Processors of a Distributed Computing Environment";

U.S. Pat. No. 5,787,250, issued Jul. 28, 1998, entitled "Program Product for Managing Membership of a Group of Processors in a Distributed Computing Environment";

U.S. Pat. No. 5,787,249, issued Jul. 28, 1998, entitled "Method for Managing Membership of a Group of Processors in a Distributed Computing Environment";

U.S. Pat. No. 5,768,538, issued Jun. 16, 1998, entitled "Barrier Synchronization Method Wherein Members Dynamic Voting Controls the Number of Synchronization Phases of Protocols and Progression to Each New Phase";

U.S. Pat. No. 5,764,875, issued Jun. 9, 1998, entitled "Communications Program Product Involving Groups of Processors of a Distributed Computing Environment";

U.S. Pat. No. 5,748,958, issued May 5, 1998, entitled "System for Utilizing Batch Requests to Present Membership Changes to Process Groups";

U.S. Pat. No. 5,704,032, issued Dec. 30, 1997, entitled "Method for Group Leader Recovery in a Distributed Computing Environment";

U.S. Pat. No. 5,699,501, issued Dec. 16, 1997, entitled "System for Group Leader Recovery in a Distributed Computing Environment"; and U.S. Pat. No. 5,696,896, issued Dec. 9, 1997, entitled "Program Product for Group Leader Recovery in a Distributed Computing Environment".

TECHNICAL FIELD

This invention relates in general to distributed computing environments, and in particular, to a dynamic facility for ensuring multicast routing of messages within such an environment, irrespective of failure of one or more established multicast routing node.

BACKGROUND OF THE INVENTION

Many network environments enable messages to be forwarded from one site within the network to one or more other sites using a multicast protocol. Typical multicast protocols send messages from one site to one or more other sites based on information stored within a message header. One example of a system that includes such a network environment is a publish/subscribe system. In publish/subscribe systems, publishers post messages and subscribers independently specify categories of events in which they are interested. The system takes the posted messages and includes in each message header the destination information of those subscribers indicating interest in the particular message. The system then uses the destination information in the message to forward the message through the network to the appropriate subscribers.

In large systems, there may be many subscribers interested in a particular message. Thus, a large list of destinations would need to be added to the message header for use in forwarding the message. The use of such a list, which can even be longer than the message itself, can clearly degrade system performance. Another approach is to use a multicast group, in which destinations are statically bound to a group name, and then that name is included in the message header. The message is sent to all those destinations statically bound to the name. This technique has the disadvantage of requiring static groups of destinations, which restricts flexibility in many publish/subscribe systems. Another disadvantage of static groups occurs upon failure of a destination node within the group.

Multicast messages must be routed in order to reach multiple networks in a large distributed computing environment. Multicast routing is complicated by the fact that some older routers do not support such routing. In that case, routing is conventionally solved by manually configuring selected hosts (i.e., computing nodes) as "routing points". Such routing points are capable of running host discovery protocols that enable them to configure their routing tables in such a way that all nodes of the system will then be reachable via multicast. In some cases, the multicast messages have to be routed through IP routers which do not support multicast routing. In such cases, a "tunnel" has to be configured such that two hosts in different networks can act as routing points for multicast messages. For further information on "tunneling" reference an Addison/Wesley publication entitled "TCP/IP Illustrated," by Gary Wright and Richard Stevens, ISBN 0-201-63354-X (1995), the entirety of which is hereby incorporated herein by reference. Again, tunneling end-points are usually configured manually, for example, by a network administrator.

The above-summarized solution has the weakness that the failure of any one such static routing point or node will isolate nodes of the corresponding subsystem. There is no recovery mechanism currently that can guarantee the reachability of all nodes given the failure of one or more nodes in the distributed computing environment. It could be argued that manual configuration of all nodes as routing points would allow survival of any failure. However, such a solution is still unsatisfactory because the deployment of each node as a routing node imposes unnecessary overhead, and significantly multiplies the number of messages required to be forwarded due to the increased number of routes between the nodes. The resulting degradation of transmission bandwidth is clearly unacceptable.

In view of the above, a need exists for a mechanism capable of monitoring the nodes of a distributed computing environment, and in particular, the routing nodes, and automatically react to a failure of any routing node within the environment. Furthermore, it is desirable that only one node act as a routing point to/from a network, to avoid additional overhead and pollution of network messages. This invention addresses these needs by providing a dynamic multicast routing facility for the distributed processing environment.

DISCLOSURE OF THE INVENTION

Briefly described, the invention comprises in one aspect a method for dynamically ensuring multicast messaging within-a distributed computing environment. The method includes: establishing multiple groups of computing nodes within the distributed computing environment; selecting one node of each group of computing nodes as a group leader node; forming a group of group leader nodes (GL_group) and selecting a group leader of the GL_group; and automatically creating a virtual interface for multicast messaging between the group leader node of the GL_group and at least one other group leader node within the GL_group, thereby establishing multicast routing between groups of nodes of the distributed computing environment.

In another aspect, the invention comprises,a processing method for a distributed computing environment having multiple networks of computing nodes. Each network has at least one computing node. At least one computing node of the multiple networks of computing nodes functions as a multicast routing node. The method includes: automatically responding to a failure at the at least one computing node functioning as multicast routing node to reassign the multicast routing function; and wherein the automatically responding includes dynamically reconfiguring the distributed computing environment to replace each failed multicast routing node of the at least one multicast routing node with another computing node of the multiple networks to maintain reachability of multicast messages to all functional computing nodes of the distributed computing environment.

In yet another aspect, the invention comprises a system for ensuring multicast messaging within a distributed computing environment. The system includes multiple groups of computing nodes within the distributed computing environment, and means for selecting one node of each group of computing nodes as a group leader node. The system further includes means for forming a group of group leader nodes (GL_group) and for selecting a group leader of the GL_group. In addition, a mechanism is provided for automatically creating a virtual interface for multicast messaging between the group leader node of the GL_group and at least one other group leader node within the GL_group, thereby ensuring multicast routing between groups of nodes of the distributed computing environment.

In still another aspect, a processing system is provided for a distributed computing environment which includes multiple networks of computing nodes. The multiple networks of computing nodes employ multicast messaging, with each network having at least one computing-node, and at least one computing node of the multiple networks of computing nodes functioning as multicast routing node. The system further includes means for automatically responding to a failure at the at least one computing node functioning as multicast routing node to reassign the multicast routing function. The means for automatically responding includes a mechanism for dynamically reconfiguring the distributed computing environment to replace each failed multicast routing node of the at least one multicast routing node with another computing node of the multiple networks of computing nodes to maintain reachability of multicast messages to all functional computing nodes of the distributed computing environment.

In a further aspect, an article of manufacture is presented which includes a computer program product comprising a computer usable medium having computer readable program code means therein for use in ensuring multicast messaging within a distributed computing environment. The computer readable program code means in the computer program product includes computer readable program code means for causing a computer to effect: establishing multiple groups of computing nodes within the distributed computing environment; selecting one node of each group of computing nodes as a group leader node; forming a group of group leader nodes (GL_group) and selecting a group leader of the GL_group; and automatically creating a virtual interface for multicast messaging between the group leader node of the GL_group and at least one other group leader node within the GL_group, thereby establishing multicast routing between groups of nodes of the distributed computing environment.

In a still further aspect, the invention includes an article of manufacture which includes a computer program product comprising a computer usable medium having computer readable program code means therein for maintaining multicast message reachability within a distributed computing environment having multiple networks of computing nodes employing multicast messaging. Each network has at least one computing node, and at least one computing node of the multiple networks of computing nodes functions as multicast routing node. The computer readable program code means in the computer program product includes computer readable program code means for causing a computer to effect: automatically responding to a failure at the at least one computing node functioning as the multicast routing node to reassign the multicast routing function; wherein the automatically responding comprises dynamically reconfiguring the distributed computing environment to replace each failed multicast routing node of the at least one multicast routing node with another computing node of the multiple networks of computing nodes to maintain multicast message reachability to all functional computing nodes of the distributed computing environment.

To restate, the present invention solves the problem of maintaining reachability of multicast messages in a distributed computing system having multiple networks of computing nodes. The solution, referred to as a Dynamic Multicast Routing (DMR) facility, automatically selects another computing node from a network having a failed computing node operating as the multicast routing node. Further, the DMR facility provided herein ensures that only one node of a network will act as a routing point between networks, thereby avoiding host overhead and pollution of network messages inherent, for example, in making each node of the distributed computing environment capable of receiving and sending multicast messages. In one embodiment, the DMR facility utilizes Group Services to be notified immediately of a node failure or communication adapter failure; and automatically responds thereto.

The DMR facility described herein has multiple applications in a distributed computing environment such as a cluster or parallel system. For example, the DMR facility could be used when sending a multicast datagram to a known address for service. An example of the need for a dynamic service facility is the location of the registry servers at boot time. Another use of a DMR facility in accordance with this invention is in the distribution of a given file to a large number of nodes. For example, propagation of a password file by multicast is an efficient way to distribute information. The DMR facility presented herein ensures that the multicast message gets routed to all subnets, independently of which nodes are down at any one time and independent of router box support.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which:

FIG. 2 depicts an expanded view of a number of the processing nodes of the distributed computing environment of FIG. 1;

FIG. 3 depicts one example of the components of a Group Services facility to be employed by one embodiment of a Dynamic Multicast Routing (DMR) facility in accordance with the principles of the present invention;

BEST NODE FOR CARRYING OUT THE INVENTION

In one embodiment, the techniques of the present invention are used in distributed computing environments in order to provide multi-computer applications that are highly-available. Applications that are highly-available are able to continue to execute after a failure. That is, the application is fault-tolerant and the integrity of customer data is preserved.

It is important in highly-available systems to be able to coordinate, manage and monitor changes to subsystems (for example, process groups) running on processing nodes within the distributed computing environment. In accordance with the principles of the present invention, a facility is provided for dynamically or automatically accomplishing this in a distributed computing environment employing multicast routing of data messages between nodes. The Dynamic Multicast Routing facility (herein referred to as the "DMR facility") of the present invention employs, in one example, the concepts referred to as "Group Services" in the above incorporated United States patent applications and Letters Patent.

As used herein, a "host" comprises a computer which is capable of supporting network protocols, and a "node" is a processing unit, such as a host, in a computer network. "Multicast" refers to an internet protocol (IP) multicast as the term is-used in the above-incorporated Addison/Wesley publication entitled "TCP/IP Illustrated". A "daemon" is persistent software which runs detached from a controlling terminal. "Distributed subsystem" is a group of daemons which run in different hosts. "Group Services" is software present on International Business Machines Corporation's Parallel System Support Programs (PSSP) Software Suite (i.e., operating system of the Scalable Parallel (SP)), and IBM's High Availability Cluster Multi-Processing/Enhanced Scalability (HACMP/ES) Software Suite.

Group Services is a system-wide, fault-tolerant and highly-available service that provides a facility for coordinating, managing and monitoring changes to a subsystem running on one or more processors of a distributed computing environment. Group Services provides an integrated framework for designing and implementing fault-tolerant subsystems and for providing consistent recovery of multiple subsystems. Group Services offers a simple programming model based on a small number of core concepts. These concepts include a cluster-wide process group membership and synchronization service that maintains application specific information with each process group.

Although as noted above, in one example, the mechanisms of the present invention are implemented employing the Group Services facility, the mechanisms of this invention could be used in or with various other facilities, and thus, Group Services is only one example. The use of the term "Group Services" in explaining one embodiment of the present invention is for convenience only.

Figure 1:
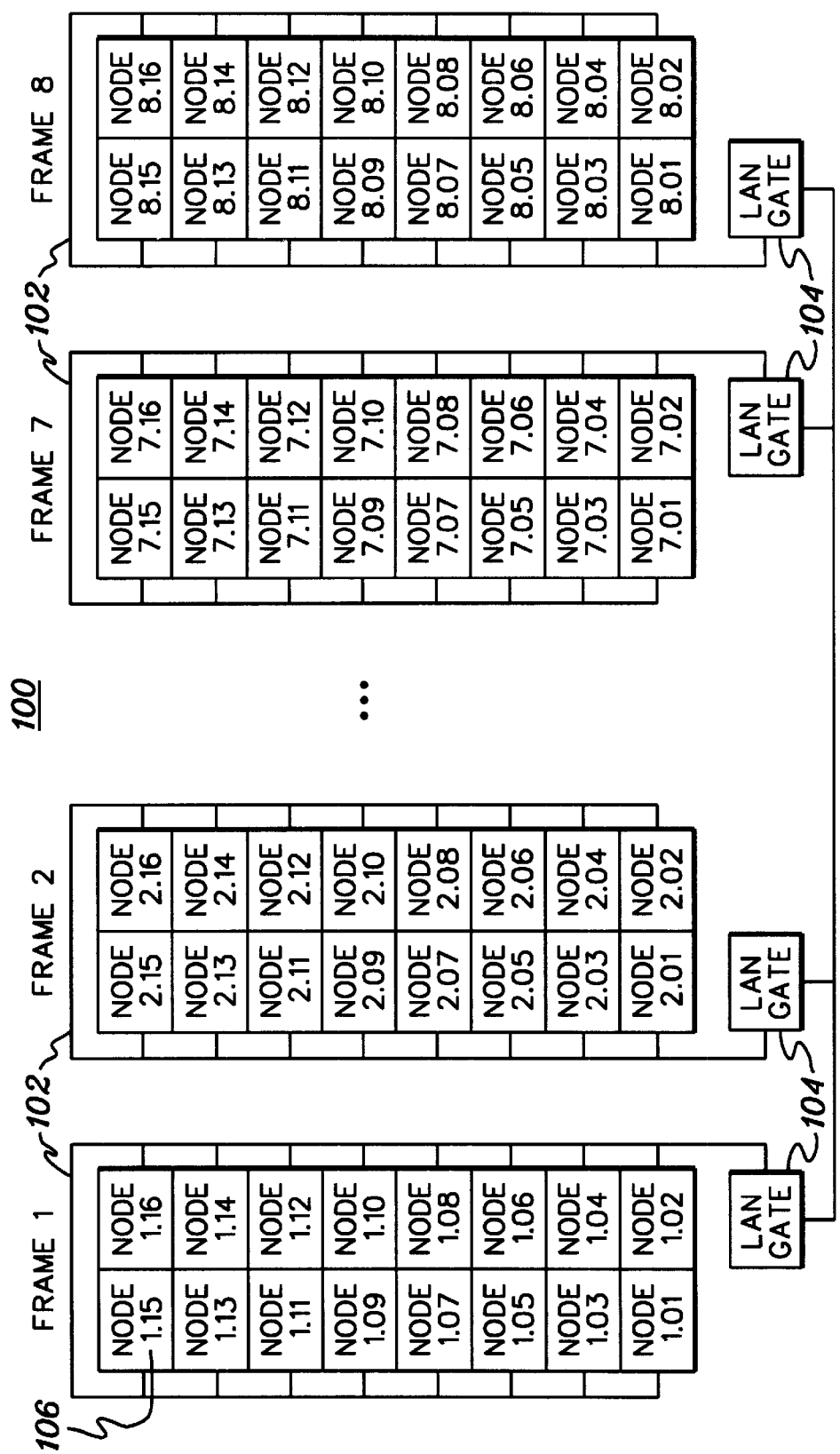
FIG. 1 depicts one example of a distributed computing environment to incorporate the principles of the present invention.

In one embodiment, the mechanisms of the present invention are incorporated and used in a distributed computing environment, such as the one depicted in FIG. 1. Distributed computing environment 100 includes, for instance, a plurality of frames 102 coupled to one another via a plurality of LAN gates 104. Frames 102 and LAN gates 104 are described in detail below.

In the example shown, distributed computing environment 100 includes eight (8) frames, each of which includes a plurality of processing or computing nodes 106. In one instance, each frame includes sixteen (16) processing nodes (a.k.a., processors). Each processing node is, for instance, a RISC/6000 computer running AIX, i.e., a UNIX based operating system. Each processing node within a-frame is coupled to the other processing nodes of the frame via, for example, an internal LAN connection. Additionally, each frame is coupled to the other frames via LAN gates 104.

As examples, each LAN gate 104 includes either a RISC/6000 computer, any computer network connection to the LAN, or a network router. However, these are only examples. It will be apparent to those skilled in the relevant art that there are other types of LAN gates, and that other mechanisms can be used to couple the frames to one another.

In addition to the above, the distributed computing environment of FIG. 1 is only one example. It is possible to have more or less than eight frames, or more or less than sixteen nodes per frame. Further, the processing nodes do not have to be RISC/6000 computers running AIX. Some or all of the processing nodes can include different types of computers and/or different operating systems. All of these variations are considered a part of the claimed invention.

In one embodiment, a Group Services subsystem incorporating the mechanisms of the present invention is distributed across a plurality of processing nodes of distributed computing environment 100. In particular, in one example, a Group Services daemon 200 (FIG. 2) is located within one or more of processing nodes 106. The Group Services daemons 200 are accessed by each process via an application programming interface 204. The Group Services daemons are collectively referred to as "Group Services".

Group Services facilitates, for instance, communication and synchronization between multiple processes of a process group, and can be used in a variety of situations, including, for example, providing a distributed recovery synchronization mechanism. A process 202 (FIG. 2) desirous of using the facilities of Group Services is coupled to a Group Services daemon 200. In particular, the process is coupled to Group Services by linking at least a part of the code associated with Group Services (e.g., the library code) into its own code.

In one embodiment, Group Services 200 includes an internal layer 302 (FIG. 3) and an external layer 304. Internal layer 302 provides a limited set of functions for external layer 304. The limited set of functions of the internal layer can be used to build a richer and broader set of functions, which are implemented by the external layer and exported to the processes via the application programming interface. The internal layer of Group Services (also referred to as a "metagroup layer") is concerned with the Group Services daemons, and not the processes (i.e., the client processes) coupled to the daemons. That is, the internal layer focuses its efforts on the processors, which include the daemons. In one example, there is only one Group Services daemon on a processing node; however, a subset or all of the processing nodes within the distributed computing environment can include Group Services daemons.

Figure 4:
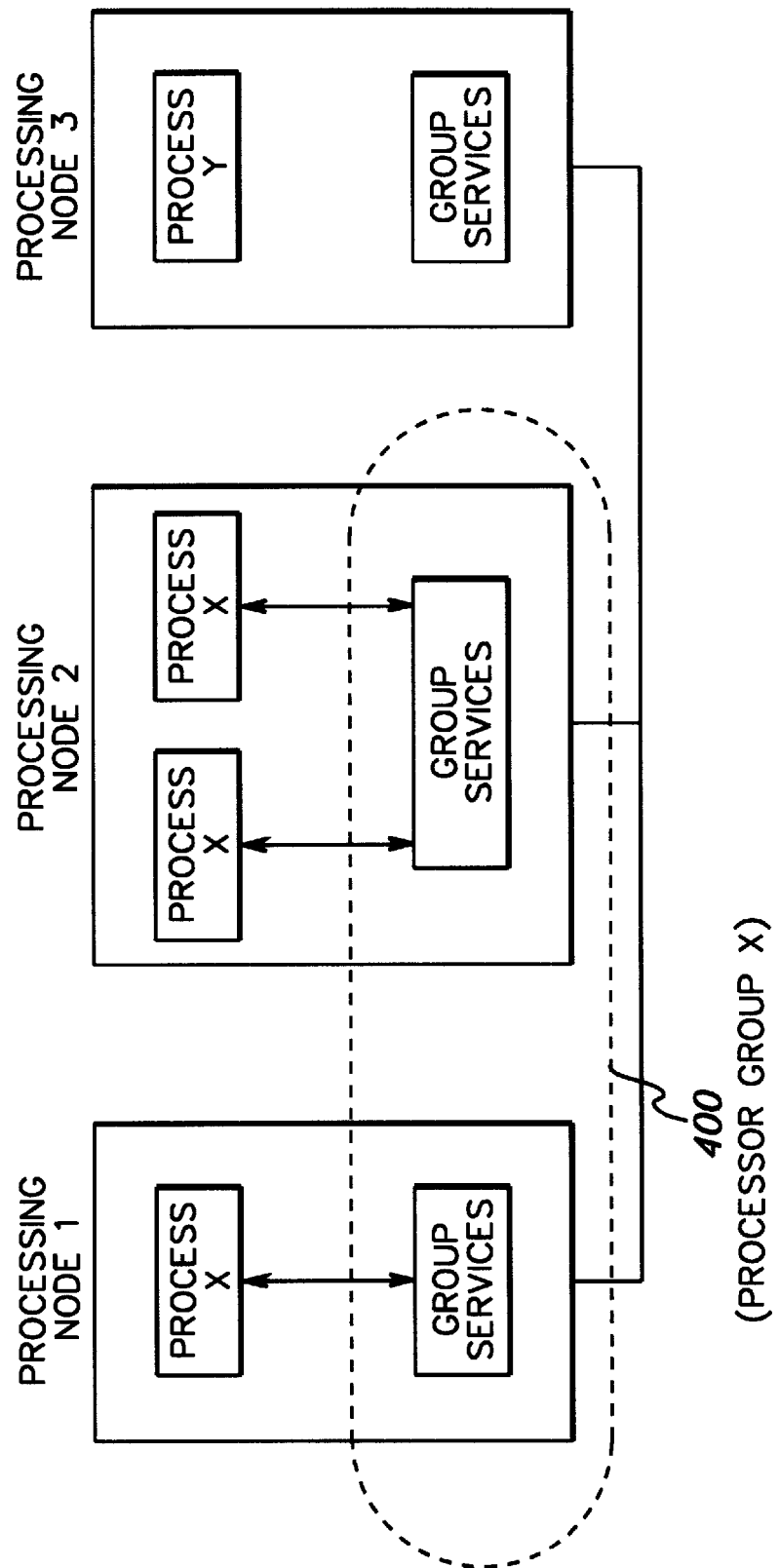
FIG. 4 illustrates one example of a processor group resulting from the Group Services protocol to be employed by said one embodiment of a DMR facility in accordance with the principles of the present invention.

The internal layer of Group Services implements functions on a per processor group basis. There may be a plurality. of processor groups in the distributed computing environment. Each processor group includes one or more processors having a Group Services daemon executing thereon. The processors of a particular group are related in that they are executing related processes. (In one example, processes that are related provide a common function.) For example, referring to FIG. 4, processor group X (400) includes processing node 1 and processing node 2, since each of these nodes is executing a process X, but it does not include processing node 3. Thus, processing nodes 1 and 2 are members of processor group X. A processing node can be a member of none or any number of processor groups,. and processor groups can have one or more members in common.

In order to become a member of a processor group, the processor needs to request to be a member of that group. A processor requests to become a member of a particular processor group (e.g., processor group X) when a process related to that group (e.g., process X) requests to join a corresponding process group (e.g., process group X) and the processor is not aware of that corresponding process group. Since the Group Services daemon on the processor handling the request to join a particular process group is not aware of the process group, it knows that it is not a member of the corresponding processor group. Thus, the processor asks to become a member, so that the process can become a member of the process group.

Internal layer 302 (FIG. 3) implements a number of functions on a per processor group basis. These functions include, for example, maintenance of group leaders.

A group leader is selected for each processor group of the network. In one example, the group leader is the first processor requesting to join a particular group. As described herein, the group leader is responsible for controlling activities associated with its processor group(s). For example, if a processing node, node 2 (FIG. 4), is the first node to request to join processor group X, then processing node 2 is the group leader and is responsible for managing the activities of processor group X. It is possible for processing node 2 to be the group leader of multiple processor groups.

If the group leader is removed from the processor group for any reason, including, for instance, the processor requests to leave the group, the processor fails or the Group Services daemon on the processor fails, then group leader recovery must take place. In one example, in order to select a new group leader, a membership list for the processor group, which is ordered in sequence of processors joining that group, is scanned, by one or more processors of the group, for the next processor in the list. The membership list is preferably stored in memory in each of the processing nodes of the processor group. Once the group leader is selected, the new group leader informs, in one embodiment, a name server that it is the new group leader. A name server might be one of the processing nodes within the distributed computing environment designated to be the name server. The name server serves as a central location for storing certain information, including, for instance, a list of all processor groups of the network and a list of the group leaders for all the processor groups. This information is stored in the memory of the name server processing node. The name server can be a processing node within the processor group or a processing node independent of the processor group.

In large clustered systems, multicast messages require routing in order to reach multiple networks. As noted initially, the problem of maintaining multicast message reachability is often complicated by the fact that certain older routers do not support multicast routing. This routing problem is conventionally solved by manually configuring the selected hosts and routers in the distributed system as "routing points". Such host routing points are capable of running host discovery protocols that enable them to configure their routing tables in such a way that all nodes in the system become reachable via multicast.

In certain cases, multicast messages have to be routed through IP routers which do not support multicast routing. In such cases, a virtual interface or "tunnel" has to be configured, such that two nodes in different networks can interface and act as routing points for multicast messages. Tunneling is described in greater detail in the above-incorporated publication by Gary Wright and Richard Stevens entitled "TCP/IP Illustrated". Again, tunneling endpoints are traditionally configured manually by a network administrator.

In accordance with the principles of the present invention, a Dynamic Multicast Routing (DMR) facility is provided which utilizes the above-described Group Services software. As noted, the Group Services software provides facilities for other distributed processes to form "groups". A group is a distributed facility which monitors the health of its members and is capable of executing protocols for them. The DMR facility of the present invention utilizes, in one example, Group Services to monitor the health of the routing nodes, and in executing its election protocols which ultimately determine which node of a plurality of nodes in the group should act as an end-point for a tunnel for multicast routing.

A DMR facility in accordance with the present invention also employs the mrouted daemon (again, as specified in the above-incorporated publication by Gary Wright and Richard Stevens entitled "TCP/IP Illustrated") to establish tunneling end-points. The DMR facility of this invention utilizes the mrouted daemon in such a way that it does not require any of a node's host discovery mechanisms to be deployed; and does not alter the established IP routing tables of the node. This behavior is desirable because the IP routes are configured separately. The DMR thus supports any configuration of IP routing, i.e., whether dynamic, static or custom made.

Figure 5:
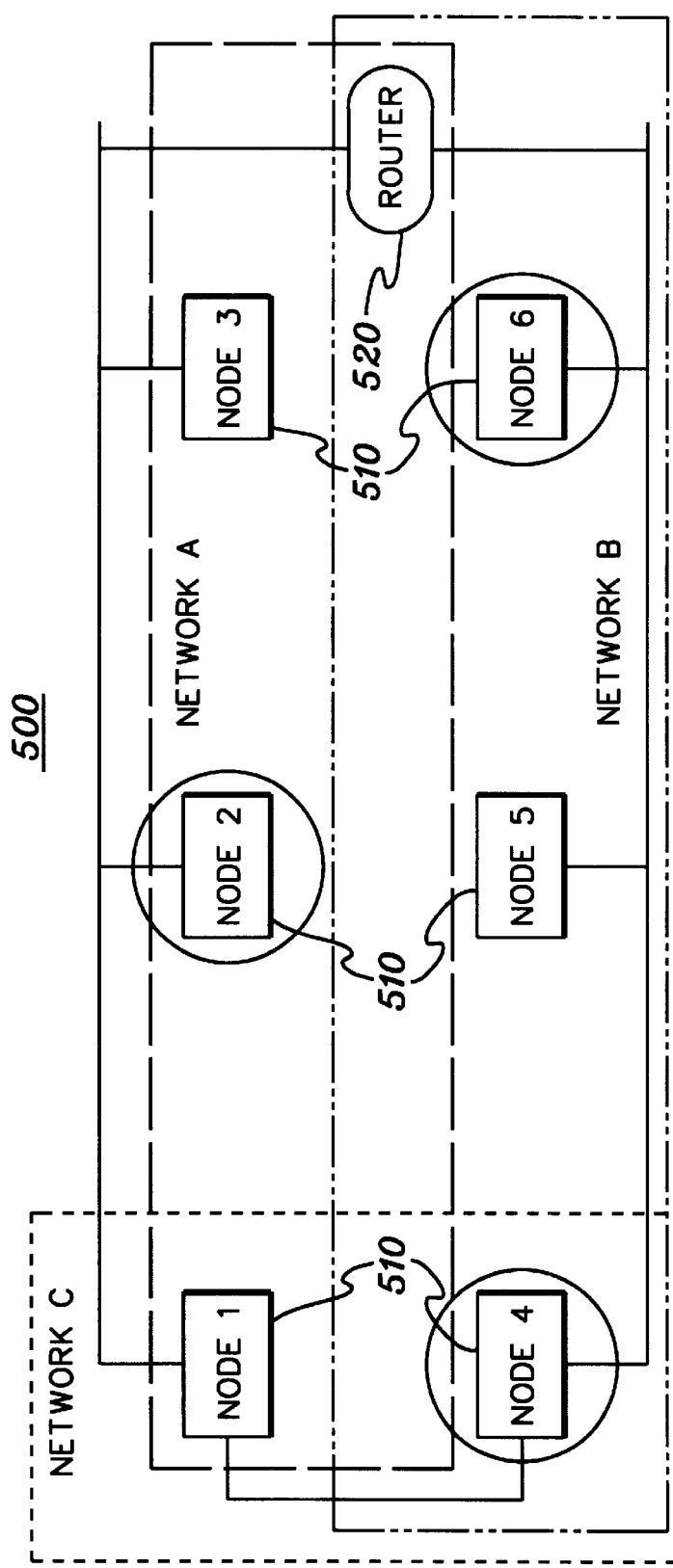
FIG. 5 depicts another example of a distributed computing environment to employ a DMR facility in accordance with the principles of the present invention, wherein multiple groups of nodes or network groups are to be virtually interfaced for multicast messaging.

FIG. 5 depicts a further example of a distributed computing environment, denoted 500, having a plurality of nodes 510 distributed among multiple networks (Network A, Network B, Network C). The DMR facility described herein implements a routing topology, in which exactly one point in each network of a plurality of interconnected networks acts as a routing or tunneling agent. For reasons described below, a network of nodes is synonymous herein with a group of nodes. The input information to the DMR facility is a collection of nodes with an arbitrary network configuration, where every node is reachable via conventional IP datagrams. Output is a dynamic set of router nodes which are configured to route multicast datagrams, either via a real interface or a virtual interface (i.e., a tunnel). This dynamic set of nodes ensures that all functional nodes within the distributed computing environment are reachable via multicast.

In the example of FIG. 5, solid lines represent actual network connections. These physical connections define three physical networks within the distributed computing environment. Namely, Network A comprising node 1, node 2, node 3 and a router 520, Network B including node 4, node 5, node 6 and router 520, and Network C having nodes 1 & 4. Router 520 in FIG. 5 is assumed to comprise a specialized hardware element which is used only for network routing. Router 520 does not comprise a computing node in the sense that it can only execute a pre-determined number of protocols. In contrast, nodes 1–6 comprise processing or computing nodes as described above and execute the DMR facility of the present invention. The circles around nodes 2, 4 & 6 identify these nodes as multicast routing points or routing nodes selected by the DMR facility for multicast message forwarding as described further herein.

One aspect of FIG. 5 is that any two computing nodes could actually be used as routing points to tunnel across the router. The DMR facility of this invention runs a special group protocol described below that ensures that only two nodes between two groups will be chosen. This DMR facility monitors the health of these chosen routing points, and does immediate, automatic reconfiguration in-the case of failure. Because reconfiguration is automatic, the routing facility is referred to herein as "dynamic".

One detailed embodiment of a technique in accordance with the principles of the present invention to dynamically determine tunneling end-points for the forwarding of multicast datagrams can be summarized as follows:

The DMR process runs in every node of the system, i.e., every node of the distributed computing environment could potentially be selected as a multicast routing node.

At initialization time, the DMR process reads the IP address and subnet mask for each communication interface (i.e., adapter) which is configured in the machine (i.e., node) that the DMR process is running on. Every node has to have at least one communication interface in order for the node to be within one network of the multiple networks in the distributed computing environment.

The DMR process makes a logical (Boolean) AND operation of the IP address and subnet mask of each communication interface, obtaining in this way a network ID. Specifically, networkID=IP_address & subnet_mask.

The DMR process then uses the network ID as a group identifier in accordance with this invention. Each DMR process will join as many groups as there are communication adapters in the node where it runs, again using the network IDs as the group identifiers.

Once the node joins a group, the DMR processes of the group act as a distributed subsystem. This means that the DMR processes are now aware of the existence of each other, and they run synchronized protocols.

When a DMR process joins a group, the process receives a membership list from Group Services. The Group Services subsystem guarantees that the first element in the list is the process that has first successfully joined the group. The DMR utilizes the ordering within the membership list to determine the group leader for each group.

After joining a group, the DMR process checks to see if it is the group leader of any group; that is, the process checks if it is the first member on any of the group membership lists. The processes which are appointed group leaders will then join another group, which consists only of group leaders. This special group is referred to herein as the "group leaders group" or "GL_group".

The members of the GL_group utilize the same technique described above to elect a group leader; that is, they pick the first member identified on the GL_group membership list.

The leader of the GL_group is referred to herein as the "system leader". Once a DMR process is appointed a system leader, the tunneling endpoints are created. The system leader's DMR will start an mrouted process and configure it for tunneling using a configuration file and a refresh signal. The-system leader DMR will configure its local mrouted daemon to tunnel multicast datagrams from all of its configured communication interfaces to each of the group leaders of the various network groups, i.e., the groups which were first formed and which utilize the networkID as group name.

The other members of the GL_group,: which are leaders of some network group, will in turn also start an mrouted process configured to route multicast datagrams from the communication interface that they are the leader of to all communication interfaces of the system leader.

The resulting network topology is that the system leader acts as a routing point for all the leaders of all the network groups.

Figure 6:
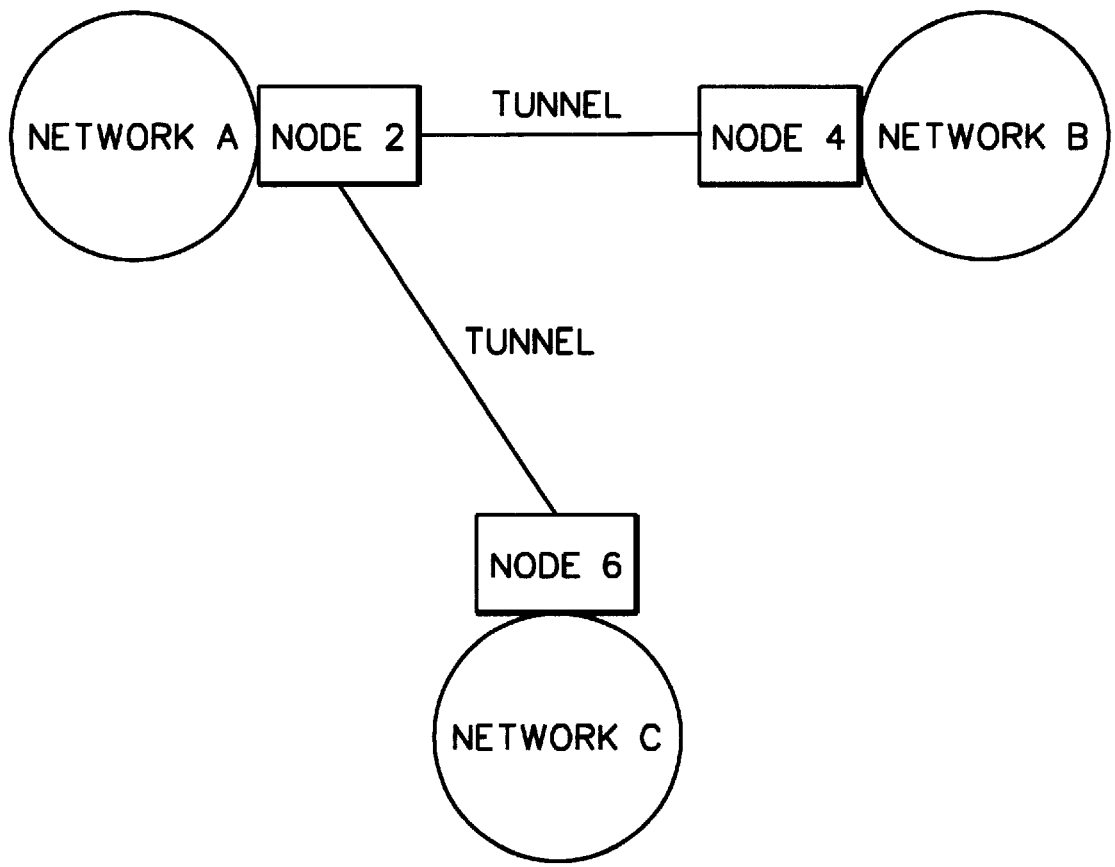
FIG. 6 depicts virtual interfaces or tunnels, established by a Dynamic Multicast Routing facility in accordance with the principles of the present invention, between a group leader node 2 and other group leader nodes 4 & 6 of the multiple network groups.

Applying the above procedure to the distributed computing environment 500 of FIG. 5, results in the topology shown in FIG. 6. This topology is arrived at by. assuming that node 2 is the first listed node of the membership list of the group comprising the nodes of network A, node 6 is the first listed node in the membership list of the nodes comprising network B, and node 4 is the first listed node in the membership list of the nodes comprising network C. Further, the topology is obtained by assuming that node 2 is the first listed group leader in the membership list for the GL__group comprising nodes 2, 4 & 6. Again, mrouted daemons at nodes 2, 4 and 6 are employed to establish the multicast tunnel connections or interfaces between these nodes. Node 2 operates to forward multicast messages to any node within Network A, node 4 forwards multicast messages to any node within Network B and node 6 forwards multicast messages to any node within Network C. Note that although not shown, the same node could operate as group leader for multiple groups of nodes. For example, node 6 could have been group leader for both network B and network C.

Figure 7:
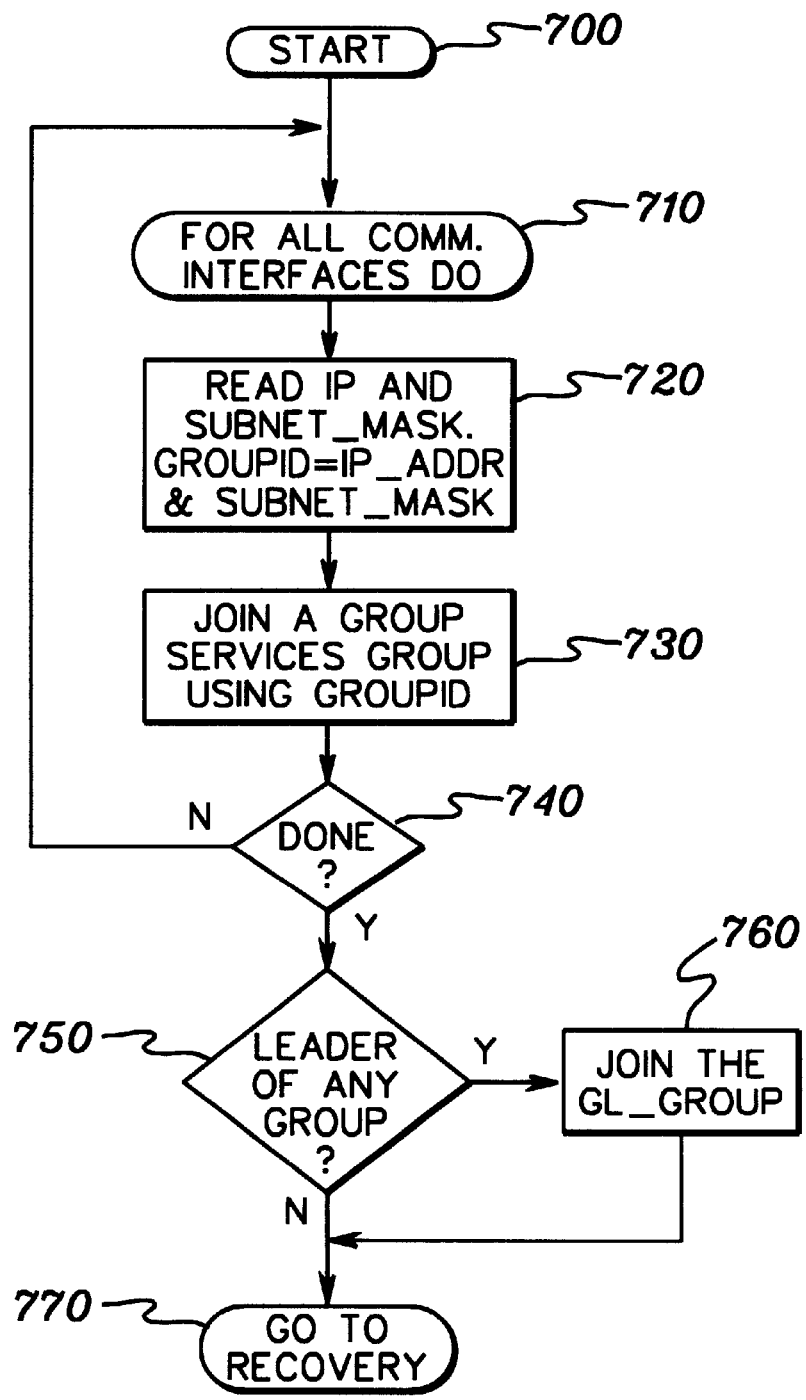
FIG. 7 is a flowchart of initialization processing in accordance with one embodiment of a Dynamic Multicast Routing facility pursuant to the principles of the present invention.

FIG. 7 depicts a flowchart of the above-described initialization processing in accordance with the present invention. The DMR facility 700 is started on each node of the distributed computing environment, and for each communication interface 710 the DMR facility reads its corresponding IP address and subnet mask to determine a networkID 720. The networkID, which is defined as IP__address & subnet__mask, is employed herein as a "group identifier", or "groupID". After determining a groupID, the node joins a Group Services group using the groupID 730 and determines whether a groupID has been determined for each of its communication interfaces 740. If no, the process repeats until each interface has a groupID determined for it, and the node has joined the corresponding Group Services group identified by that groupID.

When the DMR process joins a group, it receives a membership list from the Group Services. This membership list is then employed as described above to determine whether the node is a group leader of any group 750. Again, in one example, a node is a group leader if it is the first member on any of the membership lists of a group to which it belongs. If the node is a leader of a group, then the node joins the group of group leaders, i.e., the GL__group 760. If the node is other than a group leader, or after the node has joined the GL__group, initialization continues as noted in the recovery processing of FIG. 8 770.

Figure 8:
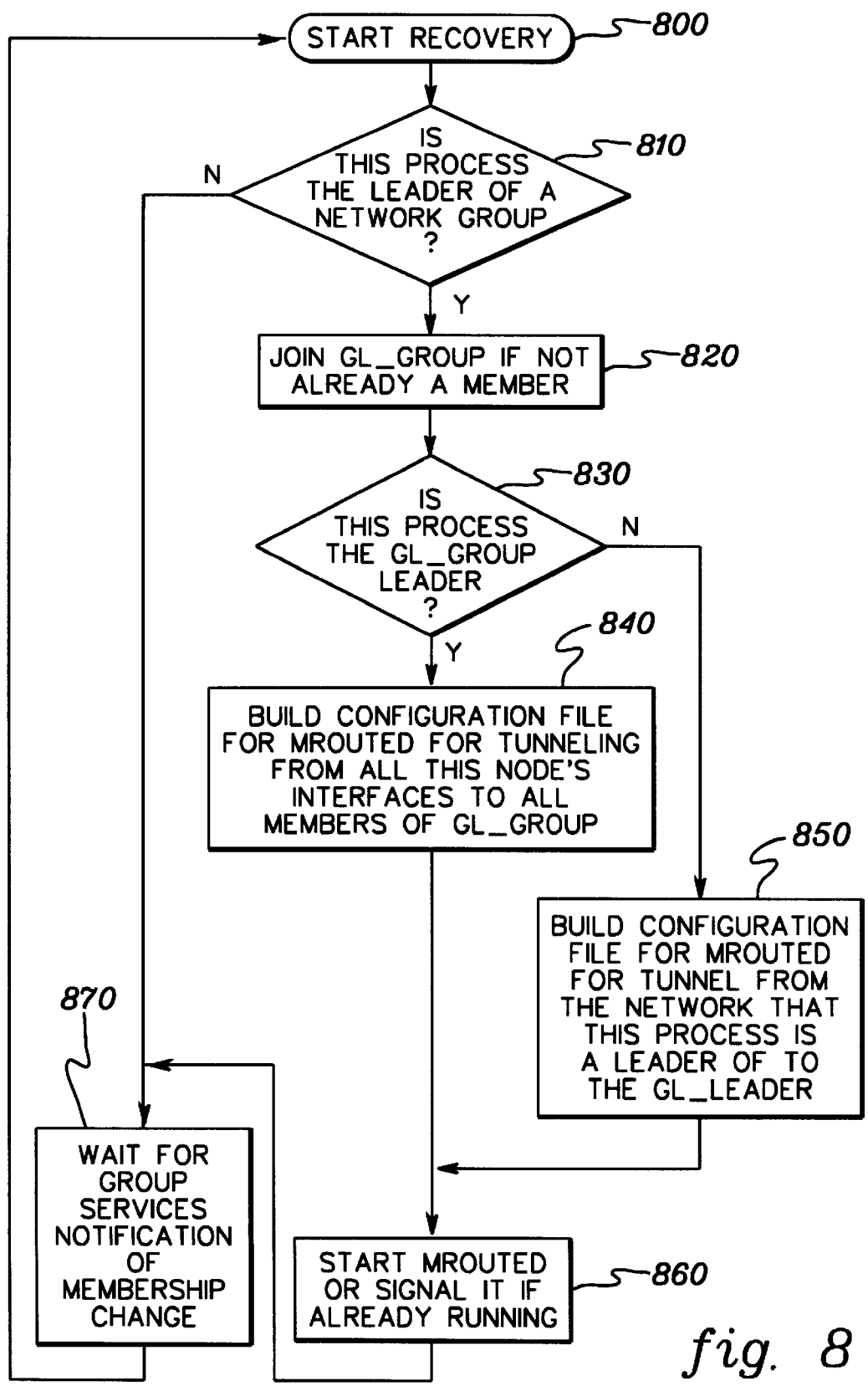
FIG. 8 is a flowchart of recovery processing in accordance with one embodiment of a Dynamic Multicast Routing facility pursuant to the principles of the present invention.

In the example of FIG. 8, recovery processing starts 800 with the DMR process inquiring whether it is the leader of a network group 810. If the DMR process is not a group leader, then the node simply waits for a Group Services notification of a membership change 870, such as the addition or deletion of a node to the group. Upon notification of a membership change, the recovery process repeats as shown.

Assuming that the DMR process is running on a node that is a group leader, then the node joins the GL__group if not already a member 820, and determines whether it is the GL__group leader 830. If so, then the node builds a configuration file for the mrouted daemon for tunneling from all of this node's interfaces to all other members of the GL__group 840. Once the configuration file is established, the mrouted daemon is started or signaled if it is already running 860. If the DMR process is on a node which is not the GL__group leader, then the node builds the configuration file for mrouted to tunnel from the network that the process is a leader of to the GL__group leader 850, and again starts the mrouted daemon or signals it if it is already running 860. After completing tunneling, the node waits for the Group Services to notify it of a membership change 870, after which processing repeats as indicated.

In accordance with the present invention, the DMR processes recover automatically from the failure of any node in the distributed computing environment by employing the group formation protocols of FIGS. 7 & 8. Any failure within the environment is immediately detected by the Group Services subsystem, which will then inform the DMR processes which belong to any of the groups that the failed node used to belong to. The surviving nodes will perform the same election mechanisms as described above. If the failed node was the group leader for a network group, a new leader is elected. Again, in one example, the new leader comprises the first listed node in the membership list of the effected group. If the failed node was the leader of the GL__group, a new leader is similarly chosen for that group. Whenever a group leader is elected, it re-establishes the tunnel endpoints as described above.

The operational loop of the DMR process depicted in FIG. 8 is based on membership within the several groups employed. After initialization, the process joins the appropriate groups, and configures the mrouted daemon as indicated. When another process joins the group, or leaves the group due to a failure, all processes get notified by the Group Services of a membership change, and all processes will make another pass at the recovery loop of FIG. 8, updating the configuration as appropriate.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the. computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A dynamic method for ensuring multicast messaging within a distributed computing environment comprising:

establishing multiple groups of computing nodes within the distributed computing environment, wherein at least some of said multiple groups are located on heterogeneous networks that support multiple protocols;

selecting one node of each group of computing nodes as a group leader node;

forming a group of group leader nodes (GL__group) and selecting a group leader of the GL__group;

automatically creating a virtual interface for multicast messaging between the group leader node of the GL__group and at least one other group leader node within said GL__group, thereby providing protocol tunneling between groups of nodes of said distributed computing environment; and wherein said automatically creating comprises for each group leader within said GL_group, determining whether said group leader is said GL_group leader, and if so, building a configuration file for tunneling from communication interfaces of said GL_group leader node to at least one other group leader in said GL_group, and performing protocol router daemon processing to build virtual interfaces between said GL_group leader and said at least one other group leader in said GL_group.

2. The dynamic method of claim 1, wherein said automatically creating comprises automatically creating a tunnel from the group leader node of the GL_group to each other group leader node within said GL_group, thereby ensuring multicast message routing between each group of said multiple groups of computing nodes of said distributed computing environment.

3. The dynamic method of claim 1, wherein said establishing multiple groups of computing nodes comprises for each computing node and for each communication interface of said computing node, determining a group identifier (groupID) from at least one of an IP address and a subnet mask for said communication interface.

4. The dynamic method of claim 3, wherein said determining said groupID comprises for each communication interface logically ANDing the IP address and the subnet mask to obtain a network identifier, and using said network identifier as a group identifier in grouping said computing nodes within the distributed computing environment.

5. The dynamic method of claim 1, wherein said selecting one node of each group of computing nodes as said group leader node comprises obtaining a membership list of all member nodes to said group of computing nodes and selecting as said group leader node a first successfully joined computing node to said group from said membership list.

6. The dynamic method of claim 1, wherein said selecting said group leader of said GL_group comprises obtaining a membership list of said GL_group and selecting as said group leader of said GL_group a first successfully joined group leader to said GL_group from said membership list.

7. The dynamic method of claim 1, wherein said automatically creating comprises for each group leader within said GL_group, determining whether said group leader is said GL_group leader, and if so, building a configuration file for mrouted tunneling from communication interfaces of said GL_group leader node to other group leaders in said GL_group, and performing mrouted daemon processing to build virtual interfaces between said GL_group leader and said other group leaders in said GL_group.

8. The dynamic method of claim 7, wherein if said group leader within said GL_group is other than said GL_group leader, said automatically creating comprises building a configuration file for mrouted tunneling from said group leader to said GL_group leader, and performing mrouted daemon processing to establish said virtual interface between said group leader and said GL_group leader.

9. The dynamic method of claim 1, further comprising automatically responding to a failure at at least one computing node of at least one group of computing nodes of the distributed computing environment by repeating said establishing, selecting, forming and automatically creating to ensure reachability of multicast messages to all functional computing nodes of said distributed computing environment.

10. The dynamic method of claim 1, wherein said automatically creating comprises creating said virtual interface for multicast messaging between the group leader of the GL_group and at least one other group leader node within the GL_group such that redundancy in routing of multicast messages is avoided within the distributed computing environment.

11. A system for ensuring IP multicast messaging within a distributed computing environment comprising:

multiple groups of computing nodes within the distributed computing environment, wherein at least some of said multiple groups are located on heterogeneous networks that support multiple protocols;

means for selecting one node of each group of computing nodes as a group leader node;

means for forming a group of group leader nodes (GL_group) and selecting a group leader of the GL_group;

means for automatically creating a virtual interface for multicast messaging between the group leader node of the GL_group and at least one other group leader node within said GL_group, thereby providing protocol tunneling between groups of nodes of the distributed computing environment; and wherein said means for automatically creating comprises for each group leader within said GL_group, means for determining whether said group leader is said GL_group leader, and if so, for building a configuration file for tunneling from communication interfaces of said GL_group leader node to at least one other group leader in said GL_group, and for performing protocol router daemon processing to build virtual interfaces between said GL_group leader and said at least one other group leader in said GL_group.

12. The system of claim 11, wherein said means for automatically creating comprises-means for automatically creating a tunnel from the group leader node of the GL_group to each other group leader node within said GL_group, thereby ensuring multicast message routing between each group of said multiple groups of computing nodes of said distributed computing environment.

13. The system of claim 11, wherein said means for establishing multiple groups of computing nodes comprises means disposed at each computing node for determining for each communication interface of said node a group identifier (groupID) from at least one of an IP address and a subnet mask for said communication interface.

14. The system of claim 13, wherein said means for determining said groupID comprises means for each communication interface for logically ANDing the IP address and the subnet mask to obtain a network identifier, and for using said network identifier as a group identifier in grouping said computing nodes within said distributed computing environment.

15. The system of claim 11, wherein said means for selecting one node of each group of computing nodes as said group leader node comprises means for obtaining a membership list of all member nodes to said group of computing nodes and for selecting as said group leader node a first successfully joined computing node to said group from said membership list.

16. The system of claim 11, wherein said means for selecting said group leader of said GL_group comprises means for obtaining a membership list of said GL_group and for selecting as said group leader of said GL_group a first successfully joined group leader to said GL_group from said membership list.

17. The system of claim 11, wherein said means for automatically creating comprises for each group leader within said GL_group, means for determining whether said group leader is said GL_group leader, and if so, for building a configuration file for mrouted tunneling from communication interfaces of said GL_group leader node to other group leaders in said GL_group, and means for performing mrouted daemon processing to build virtual interfaces between said GL_group leader and said other group leaders in said GL_group.

18. The system of claim 11, further comprising means for automatically responding to a failure at at least one computing node of at least one group of computing nodes of the distributed computing environment by repeating said means for establishing, means for selecting, means for forming, and means for automatically creating to ensure reachability of multicast messages to all functional computing nodes of the distributed computing environment.

19. The system of claim 11, wherein said means for automatically creating comprises means for creating said virtual interface for multicast messaging between said group leader of the GL_group and at least one other group leader node within the GL_group such that redundancy in routing of multicast messages is avoided within the distributed computing environment.

20. An article of manufacture comprising:
a computer program product comprising a computer usable medium having computer readable program code means therein for use in providing multicast messaging within a distributed computing environment, said computer readable program code means in said computer program product comprising:
(i) computer readable program code means for causing a computer to effect establishing multiple groups of computing nodes within the distributed computing environment, wherein at least some of said multiple groups are located on heterogeneous networks that support multiple protocols;
(ii) computer readable program code means for causing a computer to effect selecting one node of each group of computing nodes as a group leader node;
(iii) computer readable program code means for causing a computer to effect forming a group of group leader nodes (GL_group) and selecting a group leader of the GL_group;
(iv) computer readable program code means for causing a computer to effect automatically creating a virtual interface for IP multicast messaging between the group leader-node of the GL_group and at least one other group leader node within said GL_group, thereby providing protocol tunneling between groups of nodes of said distributed computing environment; and
wherein said automatically creating comprises for each group leader within said GL_group, determining whether said group leader is said GL_group leader, and if so, building a configuration file for tunneling from communication interfaces of said GL_group leader node to at least one other group leader in said GL_group, and performing protocol router daemon processing to build virtual interfaces between said GL_group leader and said at least one other group leader in said GL_group.

21. The article of manufacture of claim 20, wherein said computer readable program code means for causing a computer to effect automatically creating comprises computer readable program code means for causing a computer to effect automatically creating a tunnel from the group leader node of the GL_group to each other group leader node within the GL_group, thereby ensuring multicast message routing between each group of said multiple groups of computing nodes of the distributed computing environment.

22. The article of manufacture of claim 20, wherein said computer readable program code means for causing a computer to effect automatically creating comprises computer readable program code means for causing a computer to effect creating said virtual interface for multicast messaging between the group leader of the GL_group and at least one other group leader node within the GL_group such that redundancy in routing of multicast messages is avoided within the distributed computing environment.

23. The article of manufacture of claim 20, further comprising computer readable program code means for causing a computer to effect automatically responding to a failure at at least one computing node of at least one group of computing nodes of the distributed computing environment to ensure reachability of multicast messages to all functional computing nodes of said distributed computing environment.

24. A system for ensuring multicast messaging within a distributed computing environment comprising:
multiple groups of computing nodes within the distributed computing environment, wherein at least some of said multiple groups are located on heterogeneous networks that support multiple protocols;
a processor associated with the distributed computing environment; and
code executable by said processor associated with said distributed computing environment, said code causing said processor to effect:
selecting one node of each group of computing nodes as a group leader node;
forming a group of group leader nodes (GL_group) and selecting a group leader of the GL_group;
automatically creating a virtual interface for multicast messaging between the group leader node of the GL_group and at least one other group leader node within said GL_group, thereby providing protocol tunneling between groups of nodes of said distributed computing environment; and
wherein said automatically creating comprises for each group leader within said GL_group, determining whether said group leader is said GL_group leader, and if so, building a configuration file for tunneling from communication interfaces of said GL_group leader node to at least one other group leader in said GL_group, and performing protocol router daemon processing to build virtual interfaces between said GL_group leader and said at least one other group leader in said GL_group.

* * * * *